United States Patent [19]

Jones et al.

[11] 4,411,673
[45] Oct. 25, 1983

[54] METHOD AND APPARATUS FOR DEGASSING LIQUIDS

[75] Inventors: Bradley N. Jones, Cerritos; Robert J. Harris, Studio City; Ronald P. Cram, Whittier; Gene A. Huber, Torrence, all of Calif.

[73] Assignee: Sweco, Incorporated, Los Angeles, Calif.

[21] Appl. No.: 169,845

[22] Filed: Jul. 17, 1980

[51] Int. Cl.³ .............................................. B01D 19/00
[52] U.S. Cl. ........................................ 55/41; 55/52; 55/55; 55/191; 55/204
[58] Field of Search ................... 55/55, 52, 189, 190, 55/191, 194, 165, 166, 167, 168, 38, 41, 43, 57, 204, 207, 459 A, 459 C, 459 D, 203; 210/512.2, 512.3

[56] References Cited

U.S. PATENT DOCUMENTS

| | | | |
|---|---|---|---|
| 1,511,876 | 10/1924 | Ehrhart | 55/194 X |
| 1,809,441 | 6/1931 | Elliott | 55/41 |
| 2,685,937 | 8/1954 | Clark et al. | 55/194 X |
| 2,757,581 | 8/1956 | Freeman et al. | 92/28 |
| 2,977,355 | 3/1961 | Bradshaw et al. | 260/233 |
| 3,362,136 | 1/1968 | Burnham, Sr. et al. | 55/165 |
| 3,421,622 | 1/1969 | Wurtmann | 55/41 X |
| 3,529,405 | 7/1968 | Ashbrook | 55/191 |
| 3,973,930 | 8/1976 | Burgess | 55/41 |
| 4,030,897 | 6/1977 | Peizer et al. | 55/42 |
| 4,124,409 | 11/1978 | Gladden | 134/21 |

FOREIGN PATENT DOCUMENTS

| | | | |
|---|---|---|---|
| 918105 | 5/1959 | United Kingdom | 55/55 |
| 1304003 | 3/1969 | United Kingdom | 55/52 |
| 461194 | 4/1975 | U.S.S.R. | 55/55 |

OTHER PUBLICATIONS

Sales Brochure "Burgess, Magna-vac Degassers", Burgess & Assoc. Mfg. Inc., Houston, Tex.
Sales Brochure "Swaco D-Gasser", Dresser Industries, Inc., Houston, Tex.

*Primary Examiner*—Frank A. Spear, Jr.
*Attorney, Agent, or Firm*—Lyon & Lyon

[57] ABSTRACT

A degasser system having a central container and degasser tubes extending to the central container. A vacuum is maintained within the tubes and the container by means of a vacuum pump while liquid is extracted from the central container by a pump. A gas cut liquid is drawn into the tubes by vacuum and conditioned to assume a helical path through the tubes. The liquid is then dispersed into the tank where it is allowed to collect. The degasser intake is throttled as a function of the level of liquid within the container. The accumulated gas within the degasser is extracted from a central location in one of the tubes. The pump includes a housing for total emersion of the pump body, dual inlets, straight, radial impeller vanes, multiple volutes and an extended drive shaft to accommodate gas cut mud.

22 Claims, 8 Drawing Figures

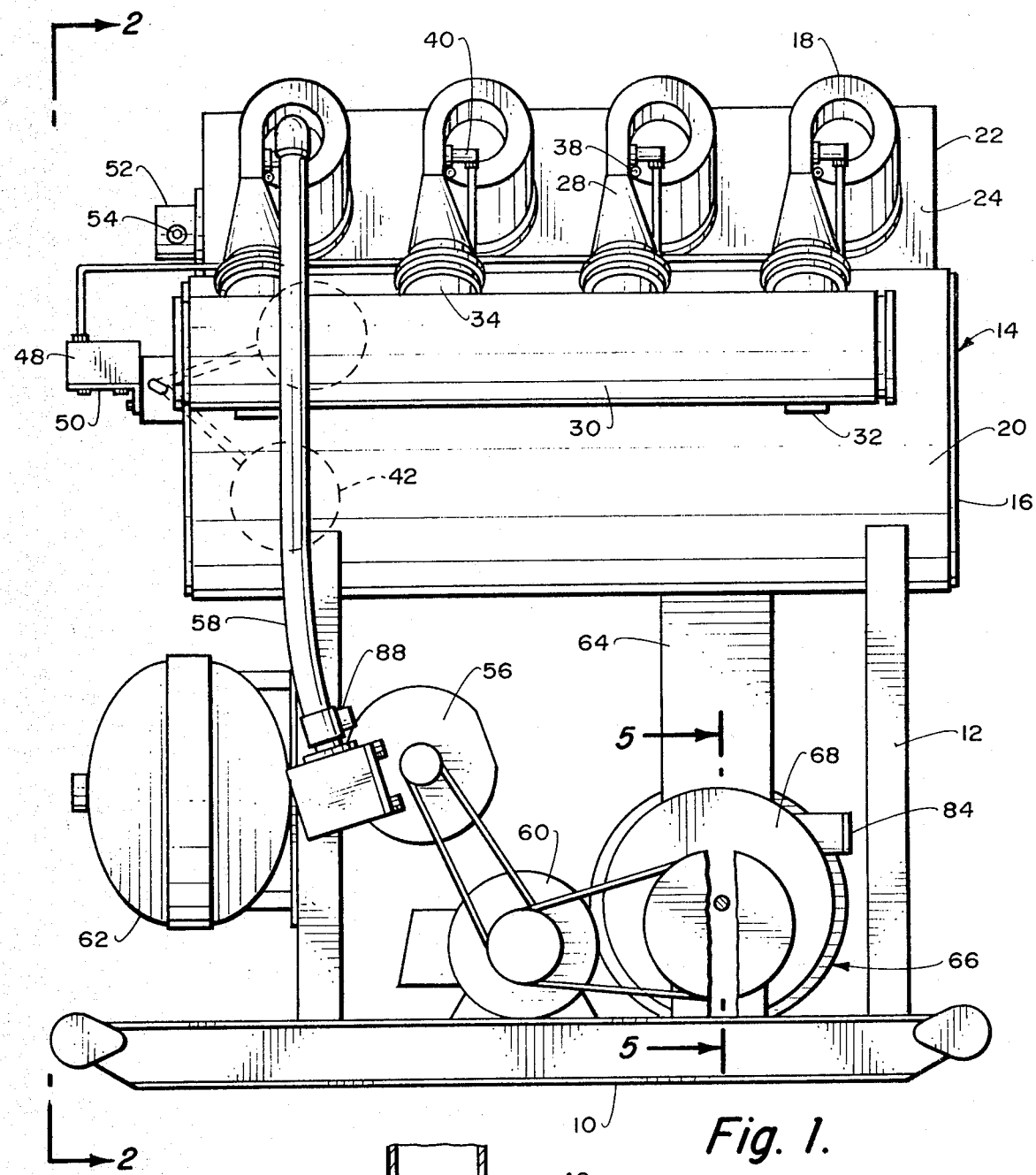
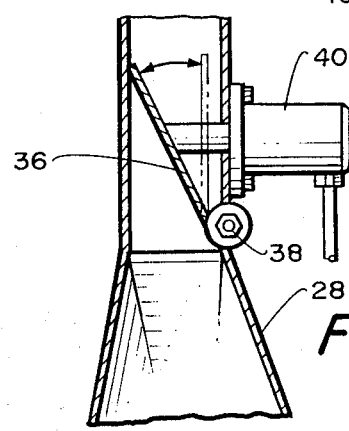
Fig. 1.
Fig. 4.

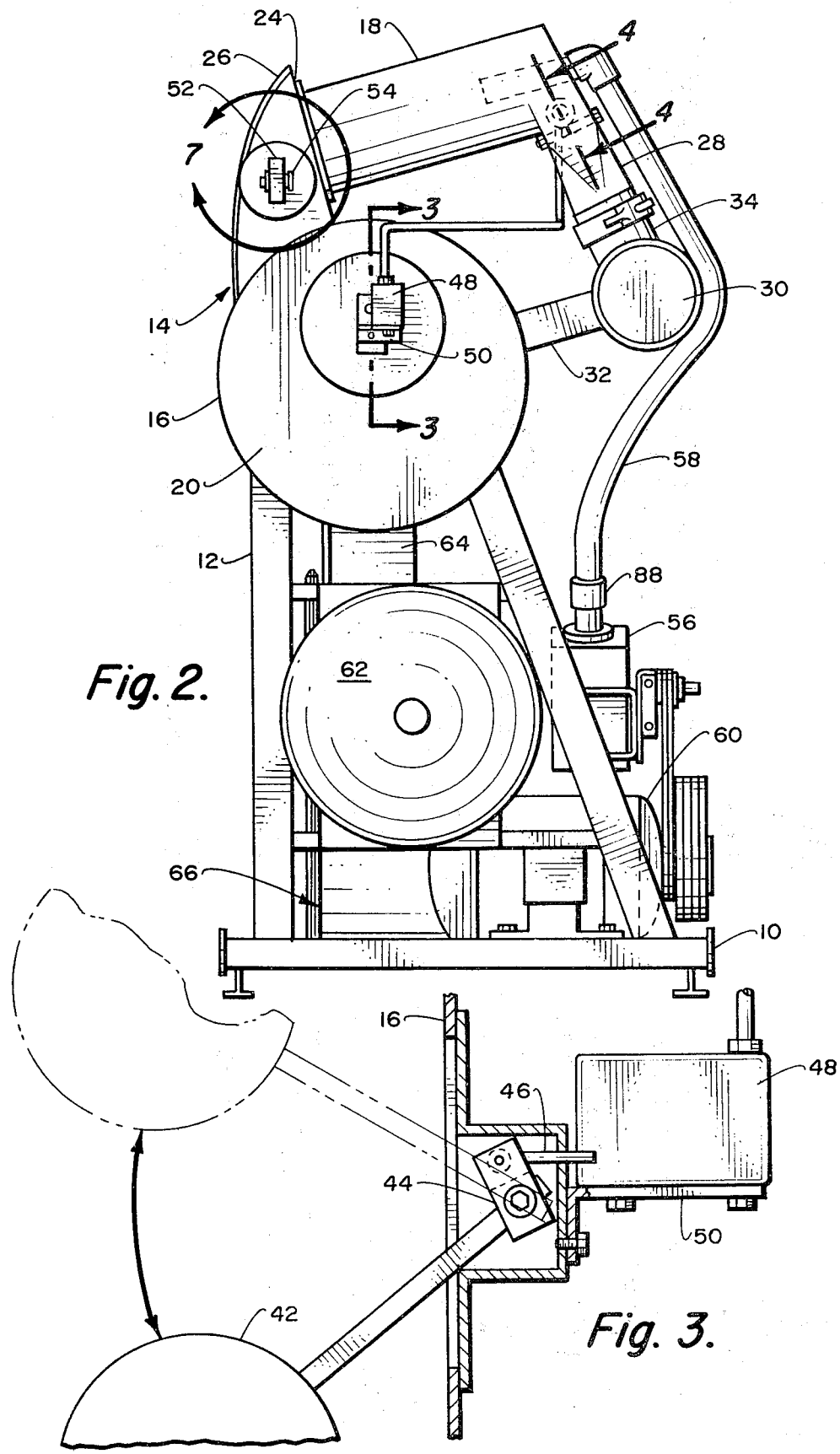

4,411,673

METHOD AND APPARATUS FOR DEGASSING LIQUIDS

BACKGROUND OF THE INVENTION

This invention relates to degassing of liquids and has particular application for the degassing of drilling muds.

As oil well drilling mud has become more and more sophisticated and the overall operation of the well drilling more and more automated, mud handling equipment has been sought to efficiently, quickly and automatically process mud for reuse. One of the necessary operations under certain well conditions is the removal of gas from the mud returning from the well bore. Gas cut mud can be a problem both in the well bore and in various treating apparatus. In the well bore, the lighter gas can result in head loss in the well. In treatment apparatus, the gas causes major cavitation problems when pumped. Gas-cut mud is intended to mean a mixture of liquid and gas including gas bubbles and entrained gas which may be dissolved. In many instances, the gasses are toxic and require controlled venting away from personnel.

Consequently, devices have been developed for the degassing of mud to overcome these problems. Two commercial types of degassers have found acceptance. The first type spreads a thin sheet of mud over a large surface area across a plate or plates in the presence of a vacuum for extraction of gas entrained in the mud.

The second type of degasser commercially accepted at the present time is a device which operates on the principle of violently throwing the mud in a radial direction outwardly to splash against the interior walls of a cylinder. In this second type of degasser, the throwing of the mud and its impacting on a surface present the gas contained within the body of the mud to the surrounding atmosphere for dissipation.

In spite of the commercial acceptance of these approaches, the need remains for more efficient, energy conservative systems. Substantial amounts of money can be saved by attention to the maximizing of efficient operation. In the thin-sheet/vacuum systems only a small amount of the total energy consumed is imparted to make the gas available for separation. Considerable energy is, in effect, wasted because of the pumping systems required to propel mud through such equipment. In the splash-type systems, less than adequate degassing results when treating heavily gas-cut mud because of efficiency losses in the direct centrifugal pumping systems required to feed such systems.

SUMMARY OF THE INVENTION

The present invention is directed to a degasser and a degassing method for liquids and is particularly suited for the degassing of drilling muds as both an apparatus and process therefor. The degasser of the present invention employs centrifugal action, high velocity thin-sheeting action and free dispersion to achieve rapid and efficient degassing. To this end, degassing tubes are employed in which the incoming liquid is induced to follow a helical path. At the end of this path, the liquid is released from the surface of the tube into a larger cavity. The liquid sprays through the cavity and impacts the walls of the cavity. In both areas, the liquid is subjected to vacuum.

An efficient system for moving the liquid and gases through the degasser has also been developed. Rather than pumping gas-cut mud with the inherent cavitation problems created, the incoming mud is accelerated by means of the vacuum contained within the unit. Thereby, a vacuum pump designed for the pumping of gases may be employed to avoid the direct pumping of gas cut liquid. The use of all available energy in the liquid drawn into the system is also accomplished by the combined sheeting and dispersion action of the system. The degassed liquid may also be accumulated within the system to provide a head for the discharge pump and provide extended residence time for the mud subject to vacuum. The remaining gases within the liquid which cannot be economically extracted are less likely to create cavitation problems in the discharge pump when operated under such a head.

The discharge pump itself is designed for efficient operation and is submerged in the degassed liquid to minimize suction requirements. The impeller and volutes of the pump are also designed for maximum efficiency for pumping liquid in which a certain amount of gas remains.

Accordingly, it is an object of the present invention to provide an improved liquid degassing system and the method and apparatus therefor.

Other and further objects and advantages will appear hereinafter.

BRIEF DESCRIPTION OF THE DRAWINGS

FIG. 1 is a front elevation of a preferred embodiment of the present invention.

FIG. 2 is a side elevation of the preferred embodiment of the present invention as taken along line 2—2 of FIG. 1.

FIG. 3 is a detailed cross-sectional view taken along line 3—3 of FIG. 2.

FIG. 4 is a detailed cross-sectional view taken along line 4—4 of FIG. 2.

DETAILED DESCRIPTION OF THE PREFERRED EMBODIMENT

Figure 5:
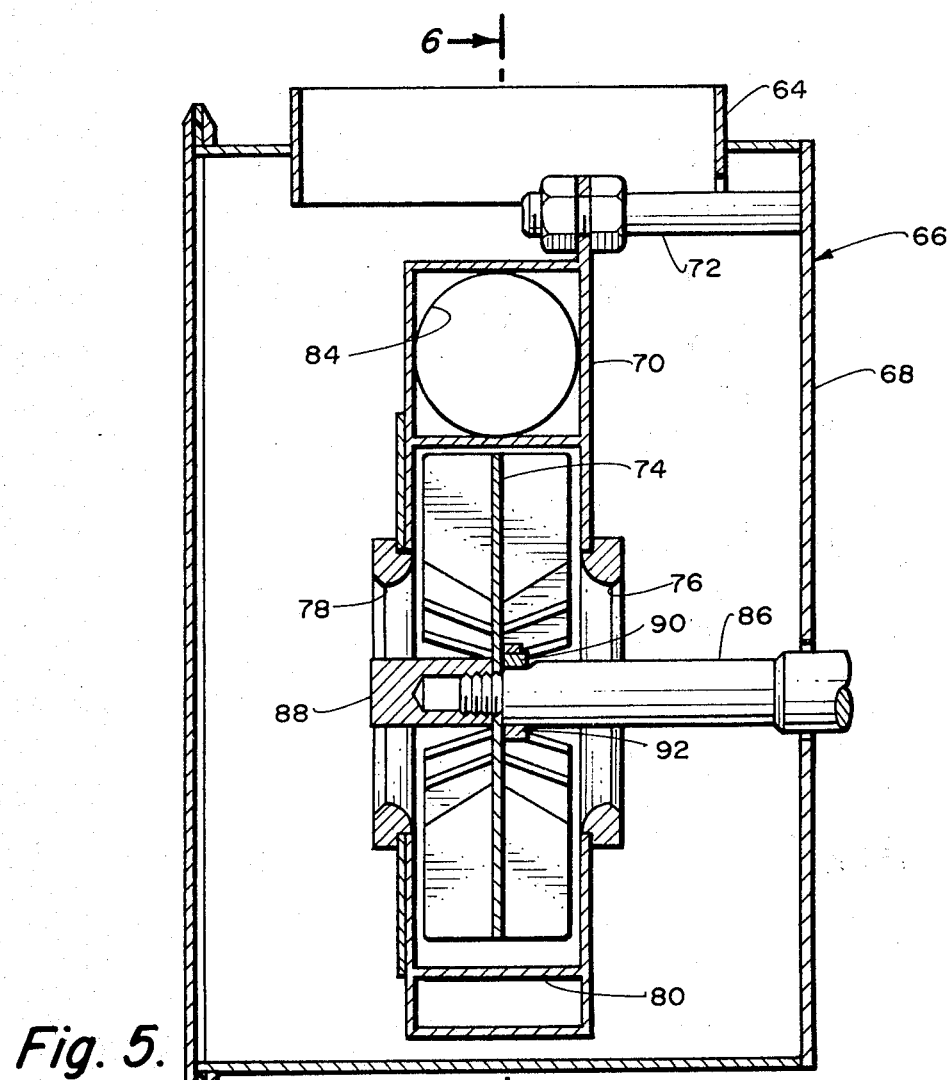
FIG. 5 is a detailed cross-sectional view taken along line 5—5 of FIG. 1.
Figure 7:
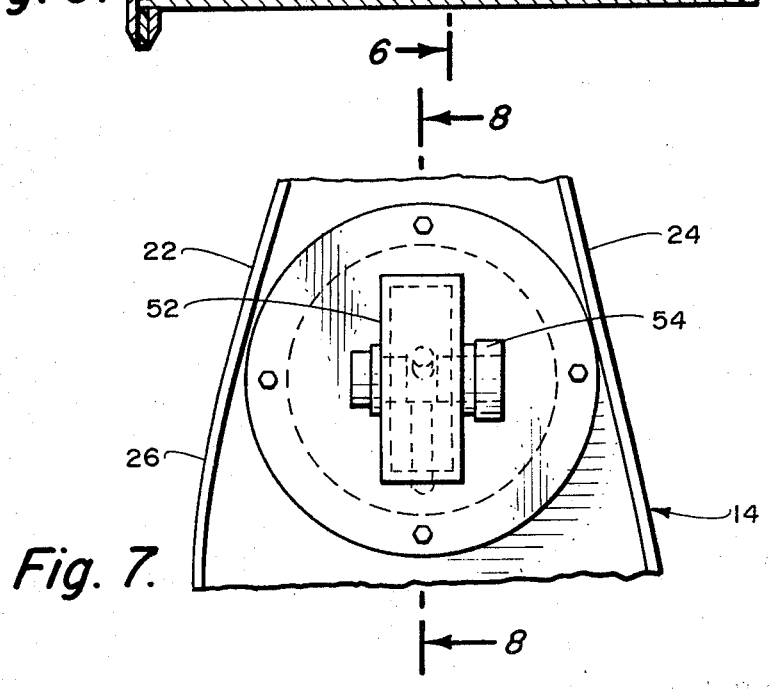
FIG. 7 is a detailed view taken of the section shown by line 7—7 of FIG. 2.

Turning in detail to the drawings, a preferred embodiment is illustrated. The degasser illustrated includes a support structure which includes a skid pad 10 and four legs 12. Positioned on the legs 12 is the main body of the degasser including a vacuum tank generally designated 14. The tank includes a central container 16 and degasser tubes 18. Four such degasser tubes 18 are illustrated although the number may vary based on design throughput. The central container 16 is generally formed from a cylindrical tank 20 with a hood 22 affixed to the length thereof. An opening is provided in the cylindrical tank 20 such that the interior of the cylindrical tank 20 and the interior of the hood 22 are in full open communication. The hood 22 includes a first, flat side 24 for easy attachment of the tubes 18. A second, arcuate side 26 is positioned in front of the ends of the tubes 18 such that liquid ejected by the tubes which travels to the far side of the hood will splash downwardly into the cylindrical tank portion 20 of the central container 16.

The tubes 18 are affixed to the flat side 24 of the hood 22 by conventional means and form an interface between the interior surface of the hood 22 and the interior surfaces of the tubes 18 which provides a sufficiently discontinuous surface such that the liquid passing along the surface of the tubes 18 will become substantially detached at this interface. The degasser tubes 18 are illustrated to be generally cylindrical but may be conical where appropriate.

At the distal end of each of the degasser tubes 18, a nozzle 28 is positioned to condition liquid flow to the interiors of the degasser tubes 18. The nozzles 28 assume rectangular cross-sections as they are narrowed in a tangential approach to the degasser tubes 18. The nozzles 28 are also inclined at an angle from perpendicular relative to the center line of the degasser tubes 18. Thus, there is induced a helical motion such that the incoming flow has a small velocity component parallel to the center lines of the degasser tubes 18 and a much larger tangential component which is turned by the tubes into circular motion. In this way, room is constantly being provided for subsequently incoming liquid and the liquid remains on the walls of the tubes. Induced, in this application, may be defined in two principal ways. First, including the nozzles at an angle from the perpendicular as described above; and secondly, when the nozzles are directly perpendicular relative to the centerline of the degasser tubes, liquid flow is forced by differential pressure into a helical motion by subsequently incoming liquid.

The helical flow provides a plurality of advantages in degassing liquid. The flow is subjected to substantial shear forces as well as forces attempting to establish irrotational flow. Thus, the thin film of liquid continuously presents new gas cut liquid to the surface for extraction of the gas by the vacuum within the tank 14. Also inherent in such flow is the central void where the vacuum within the tank is able to reach the full length of the tubes 18. This central void also insures a liquid free location for extracting vacuum from the tank as will be discussed below. Also, the induced flow within the degasser tubes 18 acts as a centrifuge to throw the heavier liquid outwardly and the lighter gases inwardly toward the central vacuum core. Upon reaching the end of the degasser tubes 18, the liquid is discharged in a diverging, substantially conical path, the form of which is dependent upon the velocity within the degasser tubes 18. Thus, further degassing can occur in the liquid when it is dispersed within the central container 16.

To provide gas cut liquid to the degasser tubes 18, a common intake manifold 30 is fixed to the side of the vacuum tank 14 by means of support members 32. The manifold 30 is open at either end such that a cap can be placed on a first end and a tube from the liquid source placed on the other. Four manifold outlets 34 extend from the manifold 30 to couple with the transition portions of the nozzles 28.

FIG. 4 specifically illustrates a control valve located in one of the nozzle areas employed to throttle flow to the degasser tubes 18. To this end, a plate valve 36 is pivotally mounted at a first end to one side of the nozzle area 28 by means of a hinge 38. The hinge is on the inside of the nozzle 28, that is to say the hinge is on the side of the nozzle 28 most adjacent the center line of the degasser tube 18. The plate valve 36 may then be forced outwardly to cause the flow to adhere to the outer wall of the nozzle area 28 for a smooth transition to the wall of the tube. The plate valve 36 is controlled by a hydraulic piston and cylinder 40. When greater amounts of flow are desired, the piston retracts to open the plate valve 36 and when less liquid is desired, the piston extends to throttle the nozzle 28 by rotation on hinge 38.

Located in the central container 16 is a sensor means for sensing the amount of liquid in the container 16. This sensor means is shown in the present invention to be a float 42. The float 42 is pivotally mounted at one end of the central container 16 to operate, as can be seen in FIG. 1, as the level of liquid within the central container 16 rises or falls. A clearer view of the float assembly 42 is illustrated in FIG. 3 where the float mechanism includes a lever arm 44 which rotates with the float 42 to drive a pin 46 into and out of a master cylinder 48. The master cylinder 48 is held to the float assembly by means of a bracket 50. The master cylinder 48 is hydraulically connected with the slave cylinders 40 associated with each of the plate valves 36. As the float 42 rises up in the central container 16, the pin 46 causes the master cylinder 48 to force the slave cylinders 40 to throttle the nozzles 28. As the float 42 moves down with decreasing liquid in the container, the nozzles 28 are again opened. In this way, the level of the liquid within the central container 16 is controlled without reducing the vacuum potential for degassing.

As a backup means for controlling the liquid within the central container 16, in case of hydraulic system failure, a secondary float 52 is positioned up in the hood 22. This secondary float 52 actuates a valve 54. The valve 54 opens to atmosphere upon raising of the float 52. As the valve 54 is connected to atmosphere, vacuum is lost in the vacuum tank 54.

To draw the gas cut liquid into the vacuum tank 14 and to extract the separated gas from the same tank, a vacuum pump 56 is connected by means of conduit 58 to the interior of the vacuum tank 14. As illustrated in FIGS. 1 and 2, the conduit 58 is specifically placed in the central portion of the interior of one of the degasser tubes 18. This has been found to be an area of the vacuum tank 14 wherein no significant amount of liquid spray or the like exists. Alternate vacuum take-off areas such as the top of the cylindrical tank 20 are also feasible. The vacuum pump 56 is driven by a motor 60 or other power source depending on the availability of electricity. Container 62 encloses an explosion-proof starter for the motor 60.

Located beneath the vacuum tank 14 is a vertical conduit 64 operating as a liquid outlet from the central container 16. The vertical conduit 64 extends to a liquid pump generally designated 66. The liquid pump is positioned to receive the benefit of the head of liquid from the pump upwardly to the central container 16. The pump 66 is located on the output end of the degasser as is the vacuum pump 56 in order that the pumps may pump either liquid or gas rather than gas-cut liquid. There remains some entrained or soluble gas in the liquid reaching the pump 66; but this is a minor amount compared with the gas in the liquid entering the manifold 30. The liquid pump 66 is therefore in a position to evacuate liquid from the degasser and to transfer the liquid to other treatment processes.

Figure 6:
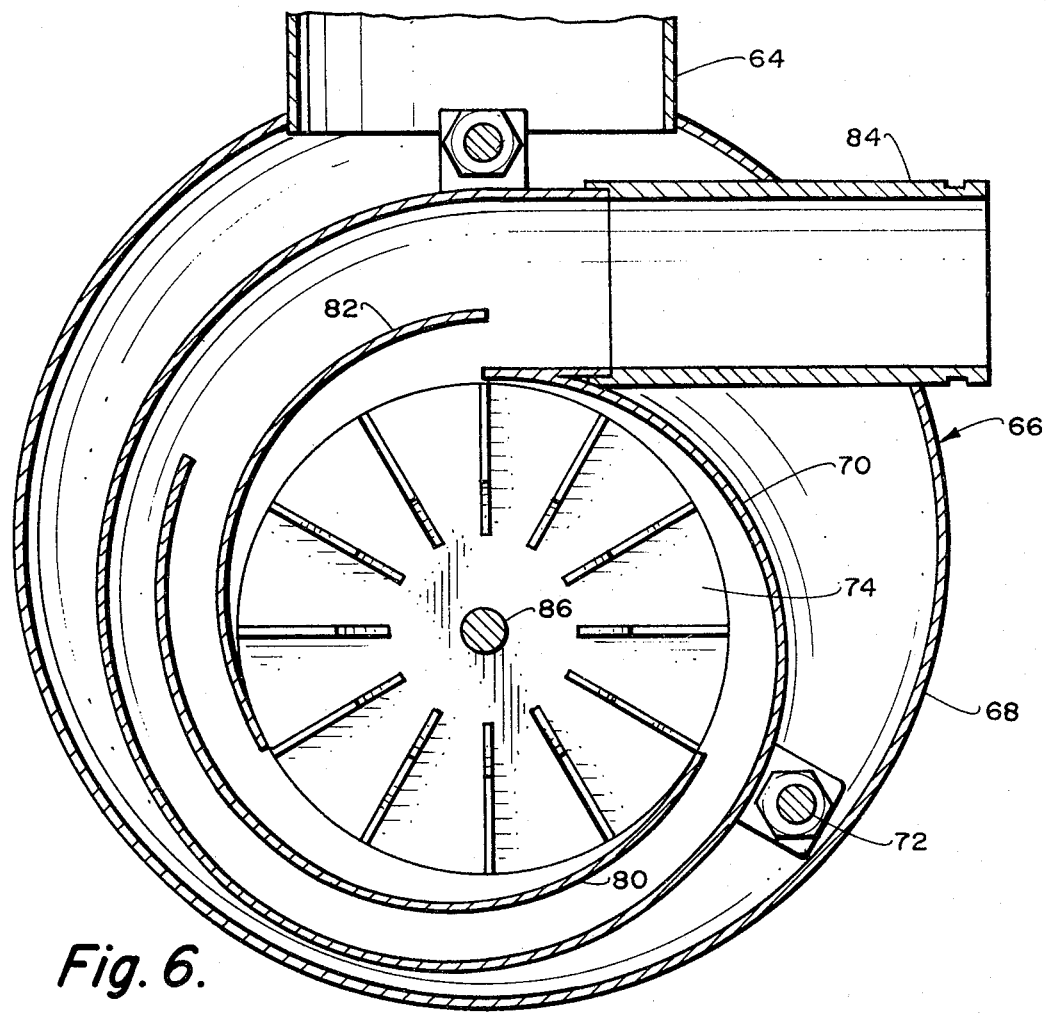
FIG. 6 is a detailed cross-sectional view taken along line 6—6 of FIG. 5.
Figure 8:
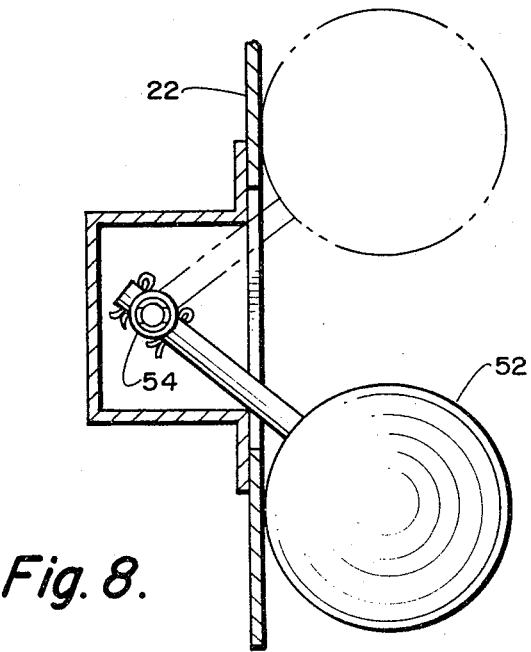
FIG. 8 is a detailed cross-sectional view taken along line 8—8 of FIG. 7.

The liquid pump 66 includes a pump housing 68 in which the actual pumping mechanism is totally submerged. The housing 68 and the vertical conduit 64 are best seen in FIGS. 5 and 6. Within the pump housing, a pump body 70 is fixed by means of mounts 72. Centrally located within the mounts 72 is an impeller 74. The impeller 74 is a double-sided, straight vane impeller which is designed to be driven at relatively low speeds (about 800-900 rpm). The impeller is semi-open, without vanes at the center thereof, but with tapered leading edges to provide smoother flow through the impeller. Thus, a combination of elements has been provided to enhance the efficiency of the impeller in a partially gas-cut liquid environment. The pump body provides further features for efficiency for the pump including dual inlets 76 and 78 to the center of the impeller 74 with smooth, rounded inlet configurations. The pump body also defines in association with baffles 80 and 82 three volutes for discharge of the liquid. The three volute configuration aids in the discharge of gas within the pump by directing it to the tengential outlet 84. The drive shaft 86 of the pump is intentionally larger than is need to support the driving load; the shaft thereby induces a first rotation. The liquid pump 66 is also driven by the motor 60.

The operation of the degasser is powered by the vacuum pump 56 and the liquid pump 66. The vacuum pump acts to draw a vacuum within the vacuum tank 14 and thus provides the differential pressure to cause liquid to be accelerated into the degasser tubes 18 through the nozzles 28. The liquid pump 66 draws degassed or substantially degassed liquid from the tank. The liquid pump 66 is aided by the head developed by the liquid above the pump. Control for the operation of the degasser is by throttling of the incoming liquid in response to the float 42 contained within the vacuum tank 14.

When the incoming gas cut liquid contains only small amounts of gas, by volume, the liquid in the central container 16 will begin to rise. As the liquid rises in the container, the valves 36 will throttle the flow until liquid inflow matches the output of the liquid pump 66 and the inlet control valves stabilize. To accommodate the fluctuating vacuum as these adjustments are being made, a relief valve 88 on the vacuum pump inlet allows air into the system. Therefore, a steady operating vacuum level is maintained.

The energy considerations associated with the degasser of the present invention are of benefit to its performance. Sufficient energy is needed to raise the liquid from the external source to the discharge level of the nozzles plus the pumping energy required to discharge the fluid from the vacuum vessel 16 to an external receiver. The energy required to raise the material this minimal height is not lost. The kinetic energy developed in falling to the liquid level in the tank helps disperse the liquid for further gas removal. Additional energy is necessary to impart kinetic energy to the liquid to give it sufficient velocity for the degassing action. This kinetic energy is the useful working energy. Naturally, ordinary losses must also be accounted for. An alternate system would require that the liquid discharge be positioned far enough below the normal liquid level within the tank 14 such that the head itself would overcome the vacuum in allowing liquid to flow from the tank 14. In such an instance, the liquid pump 66 would not be required. However, it is often advantageous that some pressure be applied to the discharged liquid for the benefit of subsequent processes and the desired vacuum in the tank makes such a system impractical.

The preferred embodiment which is illustrated in the drawings is specifically designed for the oil well drilling industry. The gas-cut liquid received by the manifold 30 is drilling mud with gas from the formation around the well bore entrained therein. The liquid discharge is substantially degassed drilling mud which may then be passed to screening systems or centrifugal separation systems or the like. The gas drawn from the vacuum tank is the gas from the formation being drilled through. This gas may be toxic or flammable and is generally conveyed away from the work area for release. The mounting of the device on a skid pad 10 lends itself to the mobility necessary in moving from drilling operation to drilling operation.

Thus, an improved degassing system employing both improved apparatus and improved method is disclosed herein. While embodiments and application of this invention have been shown and described, it would be apparent to those skilled in the art that many more modifications are possible without departing from the inventive concepts herein described. The invention, therefore, is not to be restricted except by the spirit of the appended claims.

What is claimed is:

1. A process for degassing liquids, comprising the steps of creating and maintaining a vacuum in a tank having a central container and a plurality of degassing tubes extending thereto, including pumping gas from the tank;

supplying gas cut liquid to the ends of the tubes;

directing the flow of gas cut liquid into the tubes to induce helical, thin sheet flow therein and to retain the flow of gas cut liquid in the tubes for degassing;

discharging the liquid from the tubes into the central container with sufficient velocity to disperse the liquid in the central container;

accumulating the liquid central container to establish a head of liquid; and extracting liquid accumulated in the central container.

2. A process for degassing liquids, comprising the steps of creating and maintaining a vacuum in a tank having a central container and a plurality of degassing tubes extending thereto, including pumping gas from the tank;

supplying gas cut liquids through nozzle areas to the ends of the tubes;

directing the flow of gas cut liquids to the tubes to induce helical, thin sheet flow therein;

controllably throttling the volumetric rate of flow of gas cut liquids supplied to the ends of the tubes as a function of the amount of liquid in the central container by reducing the nozzle areas;

discharging the liquid from the tubes into the central container;

accumulating the liquid in the central container to establish a head of liquid; and extracting liquid accumulated in the central container.

3. The process of claim 2 further including the steps of sensing the level of liquid in the central container, said steps of controllably throttling the gas cut liquid being controlled by the level of liquid in the central container.

4. The process of claim 2 or 3 wherein said step of discharging the liquid from each tube is conducted with sufficient velocity to disperse the liquid in the central container.

5. The process of claim 1, 2, or 3 wherein said step of creating and maintaining a vacuum in a tank includes pumping gas from the tank directly from a central location in at least one tube.

6. The process of claim 1 further including the step of controllably throttling the volumetric rate of flow of gas cut liquid supplied to the ends of the tubes as a function of the amount of liquid in the central container by reducing the inlet area to the tubes.

7. A process for degassing liquids, comprising the steps of creating and maintaining a vacuum in a tank having a central container and a plurality of degassing tubes extending thereto, including pumping gas from the tank directly from a central location in at least one of the tubes;

supplying gas cut liquid to the ends of the tubes;

directing the flow of gas cut liquid into the tubes to induce helical, thin sheet flow therein and to retain the flow of gas cut liquid in the tubes for degassing;

discharging the liquid from the tubes into the central container with sufficient velocity to disperse the liquid in the central container;

accumulating the liquid in the central container to establish a head of liquid; and extracting liquid accumulated in the central container.

8. A process for degassing liquids, comprising the steps of creating and maintaining a vacuum in a tank having a central container and a plurality of degassing tubes extending thereto, including pumping gas from the tank directly from a central location in at least one of the tubes;

supplying gas cut liquids through nozzle areas to the ends of the tubes;

directing the flow of gas cut liquids to the tubes to induce helical, thin sheet flow therein;

controllably throttling the volumetric rate of flow of gas cut liquids supplied to the ends of the tubes as a function of the amount of liquid in the central container by reducing the nozzle areas;

discharging the liquid from the tubes into the central container;

accumulating the liquid in the central container to establish a head of liquid; and extracting liquid accumulated in the central container.

9. The process of claim 8 further including the steps of sensing the level of liquid in the central container, said steps of controllably throttling the gas cut liquid being controlled by the level of liquid in the central container.

10. A process for degassing liquids, comprising the steps of creating and maintaining a vacuum in a tank having a central container and a plurality of tubes extending thereto, including pumping gas from the tank directly from a central location in at least one of the tubes;

supplying gas cut liquid to the ends of the tubes;

directing the flow of gas cut liquid into the tubes to induce helical, thin sheet flow therethrough;

discharging the liquid from the tubes into the central container;

accumulating the liquid in the central container to establish a head of liquids;

extracting the liquid accumulated in the central container.

11. The process of claim 10 wherein said step of discharging the liquid from the tubes is conducted with sufficient velocity to disperse the liquid in the central container.

12. The process of claim 10 further including the step of controllably throttling the volumetric rate of flow of gas cut liquid supplied to the ends of the tubes as a function of the amount of liquid in the central container by reducing the inlet area to the tubes.

13. A degasser comprising a central container;

degassing tubes extending to said central container and being unrestricted along their length, said central container and said tubes forming a sealed tank;

nozzles on the distal ends of said tubes, each constructed and arranged for directing gas cut liquid into a said tube in a spiral path forming a thin sheet along the interior surface of said tube, said nozzles including control valves therein positioned in said nozzles to control the nozzle area for throttling said nozzles;

passage means for directing gas cut liquid to said nozzles;

a vacuum pump having an inlet in said sealed tank to draw a vacuum on said tank, said vacuum pump being of a capacity such that said vacuum imparts sufficient velocity to the gas cut liquid entering said tubes to retain the flow of gas cut liquid on the wall of each said tube in a spiral flow to said central container; and a liquid discharge at the bottom of said tank to extract accumulated liquid from said tank.

14. The degasser of claim 13 wherein said tubes are cylindrical.

15. The degasser of claim 13 wherein the intersection between said tubes and said central container forms a discontinuous surface for separation of the liquid from the side of said tank at the intersection.

16. The degasser of claim 13 wherein said nozzles are inclined at angles from the perpendicular to the center lines of said tubes.

17. The degasser of claim 13 wherein said liquid discharge is a pump.

18. The degasser of claim 13 further comprising a sensor means for measuring the amount of liquid in said central container, said sensor means being controllably connected to said control valves and so constructed and arranged to move said control valves to further restrict said nozzle when liquid rises in said central container and to open said nozzle when the liquid lowers in said central container.

19. The degasser of claim 18 wherein said sensor means includes a float.

20. A degasser comprising a central container;

degassing tubes extending to said central container and being unrestricted along their length, said central container and said tubes forming a sealed tank;

nozzles on the distal ends of said tubes, each constructed and arranged for directing gas cut liquid into a said tube in a spiral path forming a thin sheet along the interior surface of said tube, said nozzles including control valves therein positioned in said nozzles to control the nozzle area for throttling said nozzles;

passage means for directing gas cut liquid to said nozzles;

a vacuum pump having an inlet centrally located in one of said tubes to draw a vacuum on said tank, said vacuum pump being of a capacity such that said vacuum imparts sufficient velocity to the gas cut liquid entering said tubes to retain the flow of gas cut liquid on the wall of each said tube in a spiral flow to said central container; and a liquid discharge at the bottom of said tank to extract accumulated liquid from said tank.

21. A degasser comprising a central container;

degassing tubes extending to said central container and being unrestricted along their length, said central container and said tubes forming a sealed tank;

nozzles at the distal ends of said tubes for directing gas cut liquid into said tubes, each said nozzle including a first flat side at the end thereof extending tangentially to the wall of a said tube and a plate valve positioned in said nozzle opposed to said first flat side of said nozzle to define a thin sheet of flow between said nozzle side and said plate valve;

passage means for directing gas cut liquid to said nozzles;

a vacuum pump having an inlet in said sealed tank to draw a vacuum on said tank, said vacuum pump being of a capacity such that said vacuum imparts sufficient velocity to the gas cut liquid entering said tubes to retain the flow of gas cut liquid on the wall of each said tube in a spiral flow to said central container; and a liquid discharge at the bottom of said tank to extract accumulated liquid from said tank.

22. The degasser of claim 21 further comprising a sensor means for measuring the amount of liquid in said central container, said sensor means being controllably connected to said plate valves and so constructed and arranged to move said plate valves toward said nozzle sides when liquid rises in said central container and away from said nozzle sides when liquid lowers in said central container.

* * * * *